US011200060B1

(12) United States Patent
Lagudu et al.

(10) Patent No.: US 11,200,060 B1
(45) Date of Patent: Dec. 14, 2021

(54) BROADCAST SYNCHRONIZATION FOR DYNAMICALLY ADAPTABLE ARRAYS

(71) Applicant: ADVANCED MICRO DEVICES, INC., Santa Clara, CA (US)

(72) Inventors: Sateesh Lagudu, Hyderabad (IN); Arun Vaidyanathan Ananthanarayan, Hyderabad (IN); Michael Mantor, Orlando, FL (US); Allen H. Rush, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/132,002

(22) Filed: Dec. 23, 2020

(51) Int. Cl.
*G06F 9/30* (2018.01)
*G06F 9/32* (2018.01)
*G06F 15/80* (2006.01)

(52) U.S. Cl.
CPC ............ *G06F 9/321* (2013.01); *G06F 9/3004* (2013.01); *G06F 9/30087* (2013.01); *G06F 9/30098* (2013.01); *G06F 9/30145* (2013.01); *G06F 15/80* (2013.01)

(58) Field of Classification Search
None
See application file for complete search history.

(56) References Cited

U.S. PATENT DOCUMENTS

| 5,790,130 | A  | * | 8/1998 | Gannett | G06F 12/0846 |
| | | | | | 345/587 |
| 10,558,599 | B2 | * | 2/2020 | Staudenmaier | G06F 13/28 |
| 10,614,357 | B2 | * | 4/2020 | Lie | G06F 9/4881 |
| 10,896,045 | B2 | * | 1/2021 | Sodani | G06F 9/3836 |
| 10,929,143 | B2 | * | 2/2021 | Espig | G06F 9/3013 |
| 11,023,290 | B2 | * | 6/2021 | Wilkinson | G06F 9/4881 |
| 2019/0197761 | A1 | * | 6/2019 | Saleh | G06T 15/04 |

* cited by examiner

*Primary Examiner* — Corey S Faherty

(57) ABSTRACT

An array processor includes processor element arrays (PEAs) distributed in rows and columns. The PEAs are configured to perform operations on parameter values. A first sequencer received a first direct memory access (DMA) instruction that includes a request to read data from at least one address in memory. A texture address (TA) engine requests the data from the memory based on the at least one address and a texture data (TD) engine provides the data to the PEAs. The PEAs provide first synchronization signals to the TD engine to indicate availability of registers for receiving the data. The TD engine provides second synchronization signals to the first sequencer in response to receiving acknowledgments that the PEAs have consumed the data.

20 Claims, 10 Drawing Sheets

BROADCAST SYNCHRONIZATION FOR DYNAMICALLY ADAPTABLE ARRAYS

BACKGROUND

Graphics processing units (GPUs) and other multi-threaded processing units typically implement multiple processing elements (which are also referred to as processor cores or compute units) that concurrently execute multiple instances of a single program on multiple data sets. For example, the processing elements can implement single-instruction-multiple-data (SIMD) protocols to concurrently execute the same instruction on multiple data sets using multiple processor cores. The processing elements are therefore referred to as SIMD units. A hierarchical execution model is used to match the hierarchy implemented in hardware. The execution model defines a kernel of instructions that are executed by all the waves (also referred to as wavefronts, threads, streams, or work items). In some cases, the processing power of the GPUs or other multithreaded processing units implemented in a processing system is supplemented with one or more accelerators that also implement SIMD protocols. One example of an accelerator circuit that is implemented in conjunction with GPUs or other multithreaded processing units is an array processor.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
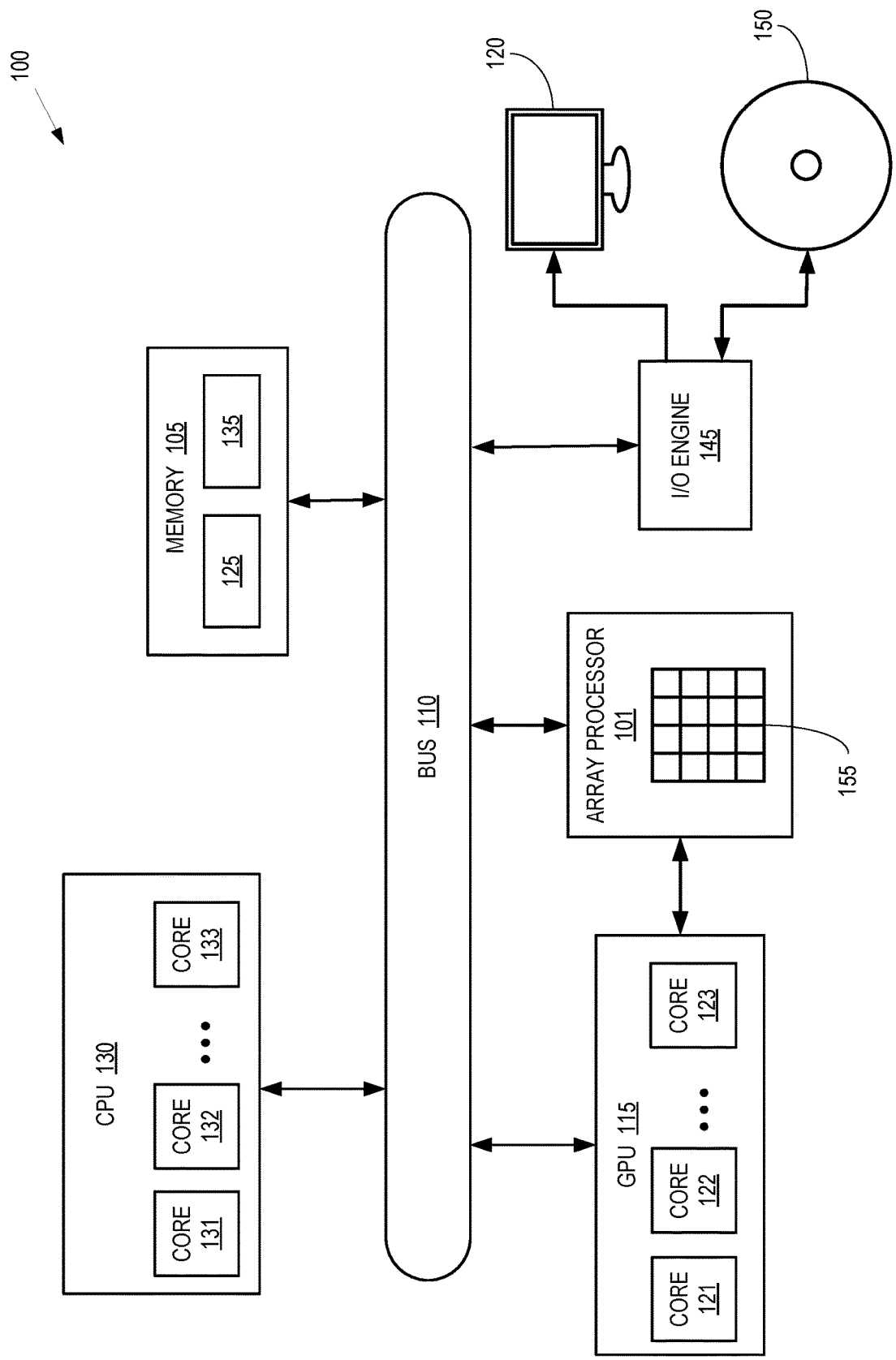
FIG. 1 is a block diagram of a processing system that implements broadcast synchronization for dynamically adaptable arrays that perform vector and matrix operations using an array processor according to some embodiments.

An array processor system includes one or more workgroup processors (WGPs) that include a set of SIMD units. For example, an array processor can include four WGP that each implement four SIMD units. A SIMD unit includes a set of processing element arrays that perform vector operations such as multiply-accumulate operations on vectors or matrices. For example, a SIMD unit can include four processing element arrays and each of the processing element arrays includes an 8×8 array of circuits to perform operations (such as multiply-accumulate operations) on a pair of input vectors. As used herein, the term "vector" can also refer to individual rows or columns of matrices. Furthermore, the term "matrix" refers generally to arrays of values including vectors, which are understood as 1×N matrices. Thus, the array processor system can perform a matrix multiplication on matrices having dimensions that correspond to the number of processing element arrays. For example, an array processor that includes four WGPs including four SIMD units made up of four processing element arrays can multiply 64×64 matrices.

In operation, sequencers receive program instructions for execution by corresponding SIMD units. For example, each SIMD unit can be associated with one direct memory access (DMA) engine and corresponding texture address (TA) and texture data (TD) engines. In response to receiving an instruction that includes addresses of input values and an operation performed on the input values, the sequencer dispatches a DMA instruction that instructs the TA engine to fetch the requested data from memory using the address unpacked from the DMA instruction. The TA engine passes the requested data to the TD engine, which provides the data to a processing element array in the corresponding SIMD unit. Many of the kernel operations performed on matrices by the array processor system reuse the same parameter values over and over. For example, a multiply-accumulate operation used to implement a machine learning application can reuse the same matrix values several times when performing a matrix multiplication. Repeatedly prefetching the same parameters consumes significant memory bandwidth in the array processor system and reduces the efficiency of the array processor system as the system becomes bandwidth limited. The prefetch bandwidth can be reduced using horizontal and vertical broadcasting into rows and columns of processing element arrays in the array processing system. However, the sequencers, DMA engines, TA engines, and TD engines are conventionally synchronized (e.g., in the OpenCL programming model) using barrier instructions inserted into code that executes on each compute unit to perform local synchronization across work items within a workgroup and a command processor programming sequence to perform global synchronization across the workgroups executing on different SIMD units. Consequently, conventional synchronization at the local and global levels introduces large latencies between the workgroups, which can be a significant performance cost in machine learning workloads.

FIGS. 1-11 disclose embodiments of a master sequencer that performs low latency synchronization of data that is broadcast to the rows and columns of processing element arrays, e.g., using horizontal and vertical broadcasting, by coordinating fetching and broadcasting the data to the processing element arrays in response to receiving an instruction. One or more slave sequencers prepare corresponding subsets of the processing element arrays to receive the broadcast data. In some embodiments, the master sequencer for a broadcast to a combination of horizontal/vertical columns is the sequencer associated with the processing element array at the intersection of the horizontal and vertical columns, e.g., a sequencer associated with a processing element array along a diagonal on the array processor system. The master sequencer receives a direct memory access (DMA) instruction including a request to read data from one or more addresses in memory. The data is to be used by operations performed by processor element arrays in multiple SIMD units associated with the master sequencer and the one or more slave sequencers. The master sequencer decodes the DMA instruction and instructs a texture address (TA) engine to request the data from the memory, e.g., by sending a DMA command packet including information indicating a burst size (or memory request unit) and a number of bursts (or memory request units) to fetch. The master sequence concurrently increments horizontal and vertical request counters by the number of memory request units. The data retrieved from the memory in response to the TA engine request is transferred to a buffer in a corresponding texture data (TD) engine, which broadcasts data from its buffer to registers in processor element arrays in a row or column of the array processor system. The processor element arrays consume the data in entries of the registers during execution of instructions.

Synchronization signals are exchanged to maintain synchronization of the sequencer, TA engine, TD engine, and processor element arrays during execution of the instructions that consume the broadcast data. The processor element arrays provide a first synchronization signal (SP_T-D_EXEC_DONE) to the TD engine to indicate a compute rate and number of free vector general-purpose registers (VGPRs) or other registers for load balancing the load broadcasts from the TD engine. Prior to broadcasting data to the processor element arrays, the TD engine determines whether sufficient free VGPRs are available to receive the broadcast data. If so, the TD engine broadcasts the data to the processor element array. The TD engine generates second synchronization signals and provides the second synchronization signals to the master sequencer (over a TD_SQ_RDDONE_ACK interface) in response to receiving acknowledgments that the current data has been successfully broadcast to the processor element arrays. In response to receiving the last synchronization signal that indicates that the broadcast has completed successfully for all the processor element arrays, the master sequencer decrements the horizontal/vertical counters based on information received in the second synchronization signals. The master sequencer issues execute commands to the processor element arrays in response to decrementing the counters and satisfaction of the corresponding waitcnt instructions. Once the counters reach zero values, indicating that outstanding requests are cleared from the memory pipeline, the sequencer provides another DMA command packet (for a corresponding DMA instruction) to the TA engine. Some embodiments of the TA engine monitor information indicating a status of the buffer in the TD engine and provide the request to retrieve data from the memory in response to the information indicating that space is available in the buffer of the TD engine. Consequently, the sequencer, TA engine, TD engine, and processing element array are locally and globally synchronized by the first and second synchronization signals.

FIG. 1 is a block diagram of a processing system 100 that implements broadcast synchronization for dynamically adaptable arrays that perform vector and matrix operations using an array processor 101 according to some embodiments. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a graphics processing unit (GPU) 115, in accordance with some embodiments. The GPU 115 renders images for presentation on a display 120. For example, the GPU 115 renders objects to produce values of pixels that are provided to the display 120, which uses the pixel values to display an image that represents the rendered objects. The GPU 115 implements a plurality of processor cores 121, 122, 123 (collectively referred to herein as "the processor cores 121-123") that execute instructions concurrently or in parallel. Some embodiments of the processor cores 121-123 operate as SIMD units that perform the same operation on different data sets. The number of processor cores 121-123 implemented in the GPU 115 is a matter of design choice and some embodiments of the GPU 115 include more or fewer processor cores than shown in FIG. 1. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. Some embodiments of the processor cores 131-133 operate as SIMD units that perform the same operation on different data sets. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

The array processor 101 supplements the processing power of the GPU 115 and, in some embodiments, the CPU 130. A set 155 of processor element arrays (PEAs) are used to perform operations that accelerate or improve the performance of the GPU 115 by allowing the GPU 115 to offload kernel operations or other tasks to one or more of the PEAs in the set 155. The PEAs are also referred to as signal processors in some cases. The PEAs return results to the GPU 115. In some embodiments, the PEAs are implemented as vector arithmetic logic units (ALUs) that include circuitry to perform arithmetic and bitwise operations on integer binary numbers. The PEAs therefore receive one or more inputs (or operands) and generate corresponding outputs based on the operands and an opcode that indicates the operation that is performed by the processor element array. The operands, opcodes, and other status values are stored in registers associated with the PEAs.

The PEAs in the set 155 are distributed in rows and columns. As discussed below, the array processor 101 also includes memory interfaces that read parameter values (e.g., from the memory 105) and broadcast sets of the parameter values to mutually exclusive subsets of the rows and columns of the PEAs. The memory interfaces are dynamically mapped to mutually exclusive subsets of the rows and columns of the PEAs in the array processor 101 based on dimensions of the matrices that provide the parameter values to the PEAs. In some cases, the PEAs are implemented as vector arithmetic logic unit (ALU) processors and the memory interfaces are implemented as direct memory access (DMA) engines. The rows of the PEAs in the subsets are mutually exclusive to the rows in the other subsets and the columns of the PEAs in the subsets are mutually exclusive to the columns in the other subsets. The matrices can be symmetric or asymmetric, e.g., one of the matrices can be a vector having a single column.

Although not shown in FIG. 1 in the interest of clarity, the array processor 101 includes (or is associated with) a set of sequencers that receive direct memory access (DMA) instructions and decode/launch the instructions to other elements. One of the sequencers is designated as a master sequencer for the DMA instructions, which include a request to read data from one or more addresses in a memory, e.g., an address in the memory 105. A texture address (TA) engine requests the data from the memory 105 based on the address included in the DMA request and a texture data (TD) engine provides the data to the PEAs in the set 155. In some embodiments, the PEAs in the set 155 exchange first synchronization signals with corresponding TD engines to indicate availability of registers in the PEA for receiving data broadcast by the TD engine. The first synchronization signals are generated in response to a first request to read first data from an address in the memory 105. The TD engines exchange second synchronization signals with the master sequencer in response to receiving acknowledgments that the PEA has consumed data broadcast by the TD engine. The master sequencer provides the TA engine with requests to read data from another address in the memory 105 based on the first and second synchronization signals. Thus, the data requests generated by the master sequencer are synchronized with the operation of the PEAs, the TA engine, and the TD engine by the first and second synchronization signals.

Figure 2:
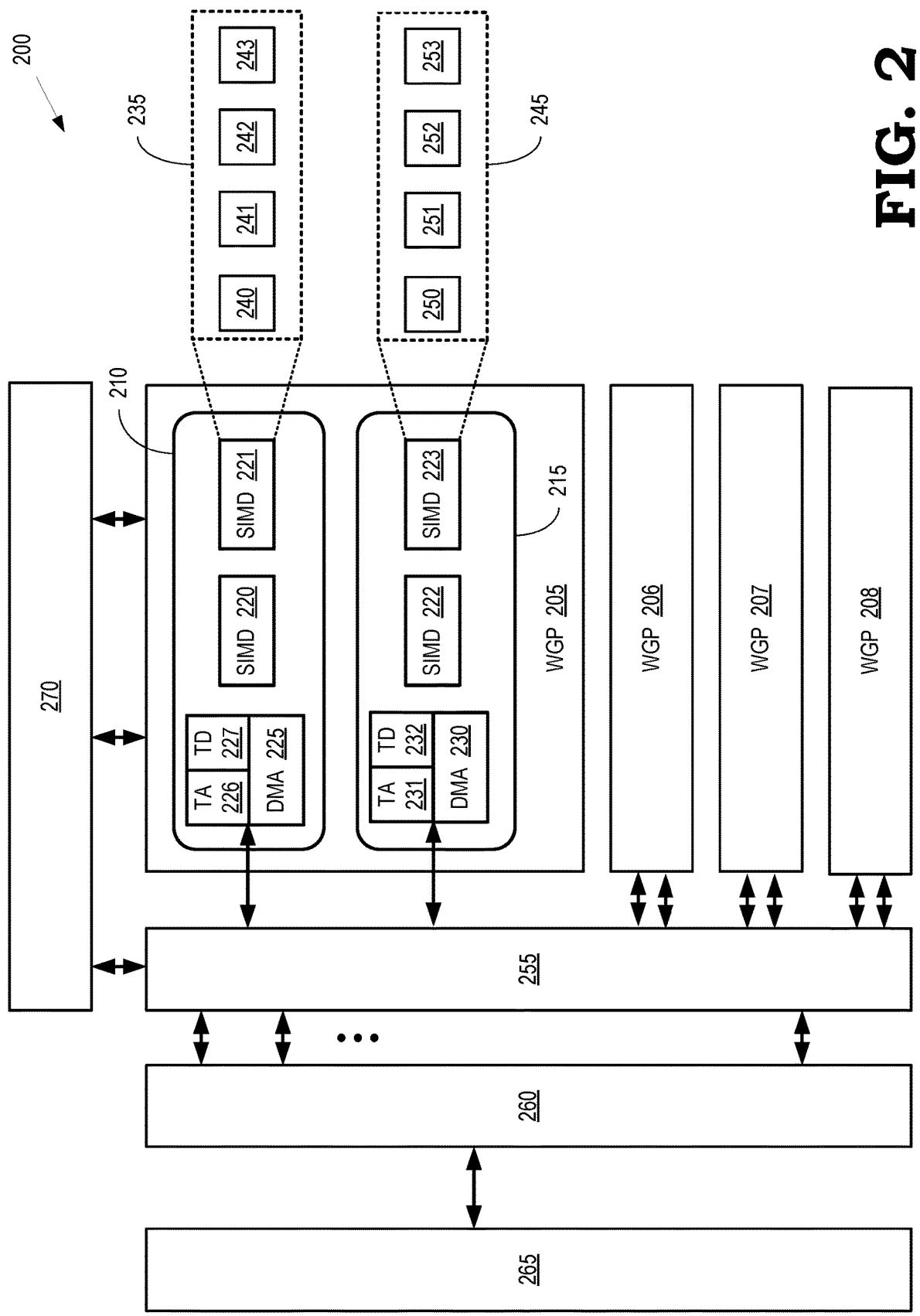
FIG. 2 is a block diagram of a portion of a processing system that implements broadcast synchronization in dynamically adaptable arrays according to some embodiments.

FIG. 2 is a block diagram of a portion 200 of a processing system that implements broadcast synchronization in dynamically adaptable arrays according to some embodiments. The portion 200 is used to implement some embodiments of the array processor 101 shown in FIG. 1. The portion 200 includes a set of WGPs 205, 206, 207, 208 (collectively referred to herein as "the WGPs 205-208") that implement pairs of compute units 210, 215. The compute units 210, 215 are only illustrated in the WGP 205 in the interest of clarity, although the WGPs 206-208 also include pairs of compute units. Some embodiments of the portion 200 implement more or fewer WGP and corresponding compute units.

The WGPs 205-208 include SIMD units 220, 221, 222, 223 (collectively referred to herein as "the SIMD units 220-223") and memory interfaces such as direct memory access (DMA) engines 225, 230. The memory interfaces also include TA engines 226, 231 and TD engines 227, 232 that operate in conjunction with the DMA engines 225, 230 and sequencers (not shown in FIG. 2 in the interest of clarity), as discussed herein. Each of the SIMD units 220-223 implements a portion of a set of PEAs. In the illustrated embodiment, the SIMD unit 221 includes a subset 235 of PEAs 240, 241, 242, 243 (collectively referred to herein as "the PEAs 240-243") and the SIMD unit 223 includes a subset 245 of PEAs 250, 251, 252, 253 (collectively referred to herein as "the PEAs 250-253"). The SIMD units 220, 222 also include other subsets of PEAs that are not shown in FIG. 2 in the interest of clarity. The PEAs 240-243, 250-253 are sometimes referred to as "PEAs 240-243, 250-253."

The DMA engines 225, 230 are connected to a memory fabric 255 that provides one or more channels between the DMA engines 225, 230 and an SRAM 260. In the illustrated embodiment, the SRAM 260 is connected to a system memory 265 such as the memory 105 shown in FIG. 1. The portion 200 also includes an asynchronous compute engine 270 that communicates with the WGPs 205-208 and the memory fabric 255.

The DMA engines 225, 230, the TA engines 226, 231, and the TD engines 227, 232 form a synchronization loop that maintains synchronization with a master sequencer and the PEAs 240-243, 250-253. Synchronization is based on a first synchronization signal that is exchanged between the PEAs 240-243, 250-253 and the TD engines 227, 231 and a second synchronization signal that is exchanged between the TD engines 227, 231 and the master sequencer. The master sequencer maintains counters (such as horizontal counters for horizontal broadcasts and vertical counters for vertical broadcasts) that keep track of the status of the data that is broadcast to the PEAs 240-243, 250-253 for processing. In some embodiments, shader code uses a barrier instruction to determine whether register resources (such as vector general-purpose registers, VGPRs) and VALU resources are free before issuing the DMA instruction. In response to determining that resources are available, the shader code issues a DMA instruction that indicates a burst size and a number of bursts to fetch, e.g., to GEMM with M, N, K size of the matrices that are to be fetched and multiplied to generate an output matrix. The burst size is also referred to as a "memory request unit" and in some cases is equivalent to M=64, N=64, K=64. For a GEMM of M=256, N=128, K=64, the total number of memory requests is equal to (256/64)*(128/64)*(64/64). The number of bursts=8 units for M=256, N=128 (1 unit is one 64×64 block) and the burst size=8 VMEM requests per unit 64×64×64 GEMM per TA engine.

The master sequencer sends the DMA register configuration (e.g., the size of a memory request unit and the number of memory request units) along with a DMA command packet to a corresponding TA engine 226, 231 over an interface such as the SQ_TA_VMEMCMD interface. The master sequencer also concurrently increments corresponding request counters (such as the horizontal request counter HVMCNT and the vertical request counter VVMCNT) by the number of memory request units indicated in the DMA register configuration information. The TA engines 226, 231 use this DMA configuration to convert the command information (e.g., the burst size) into a number of memory requests, which is equal to a number of memory requests units multiplied by a number of cache lines/request unit. In response to an indication that the data associated with all the memory request units has been returned to the corresponding TD engine 227, 232 from memory or cache, the data is broadcast to VALU units, upon checking whether the corresponding VGPRs in the PEAs 240-243, 250-253 are free based on the first synchronization signal, which is referred to herein as the SP_TA_EXEC_DONE interface signal. The SP_TA_EXEC_DONE signal allows the PEAs 240-243, 250-253 to indicate the compute rate and amount of free VGPRs/registers for future loads allowing for load balancing for the broadcast loads.

The TD engines 227, 232 start the broadcast and provide the received BUFFER_LOAD data to the PEAs 240-243, 250-253 on an interface that is referred to herein as the TD_SP_DATA_RETURN interface. The TD engines 227, 232 concurrently transmit the second synchronization signal to the sequencers, e.g., by transmitting return acknowledgements to the sequencers using a TD_SQ_RDDONE_ACK interface. In response to receiving the return acknowledgments, the sequencers monitor the BUFFER_LOADs and decrement the VVMCNT/HVMCNT counters based on the number of BUFFER_LOADs that are broadcast by the TD engines 227, 232. As the HVMCNT/VVMCNT counters decrement, the sequencers determine whether the values of the counters have reached a value that indicates that the data requested by the DMA instruction has been successfully broadcast to the PEAs 240-243, 250-253. For example, for a single DMA, the WAITCNT operations are used to guard subsequent EXECUTE/COMPUTE operations whose respective BROADCAST BUFFER_LOAD operations have completed. The SQ counter starts decrementing down in response to completion of the BROADCAST BUFFER_LOADs. Decrementing of the counters occurs in parallel ensures that the COMPUTE operations progress in parallel to (or concurrently with) the LOAD operations. Consequently, the LOAD latency is hidden by performing EXECUTION operations in parallel. Execution of the current GEMM operation is complete when waitcnt is zero. Execution of the next GEMM may therefore start.

The fetched parameter values are broadcast to mutually exclusive subsets of the PEAs including the PEAs 240-243, 250-253. In some embodiments, the DMA engines 225, 230 broadcast the parameter values to PEAs in corresponding rows and columns of the set of PEAs. For example, the DMA engine 225 can broadcast first parameter values to the PEAs in a first row (e.g., the row including the PEAs 240-243) and a first column (e.g., the column including the PEAs 240, 250). The DMA engine 230 can broadcast second parameter values to the PEAs in a second row (e.g., the PEAs 250-253) and a second column (e.g., the PEAs 241, 251). In this case, the subset of PEAs 240-243 in one row is mutually exclusive to the subset of the PEAs 250-253 in another row. The subset of PEAs in the column that includes the PEAs 240, 250 is mutually exclusive to the subset of PEAs in the column that includes the PEAs 241, 251. Thus, the DMA engines 225, 230 concurrently populate registers associated with the PEAs in the mutually exclusive subsets of the rows and columns with their corresponding fetched parameter values.

In some embodiments, subsets of the DMA engines 225, 230 are mapped to mutually exclusive subsets of the rows and columns of the PEAs 240-243, 250-253 based on dimensions of matrices that provide the parameter values to the PEAs 240-243, 250-253. In some embodiments, a master sequencer for the synchronization procedure is associated with a PEA at an intersection of a row and a column that receive the data broadcast by the master sequencer. The remaining sequencers are considered slave sequencers and are configured to broadcast the data to mutually exclusive subsets of the rows and columns corresponding to the slave sequencers.

Values of the elements in the matrices are stored in the SRAM 260 or the system memory 265 and the DMA engines 225, 230 fetch corresponding parameter values into the subsets that store values for the corresponding elements in the matrices. Some embodiments of the DMA engines 225, 230 are mapped to multiple subsets of the PEAs 240-243, 250-253 concurrently perform the kernel processing on multiple sets of matrices to generate multiple matrix outputs. The input matrices can be symmetric, e.g., two square matrices having the same vertical and horizontal dimensions, or asymmetric, e.g., the input matrices have different vertical and horizontal dimensions. In some embodiments, the PEAs 240-243, 250-253 are partitioned into a number of mutually exclusive subsets that is determined by how many PEAs 240-243, 250-253 are available, as well as the vertical and horizontal dimensions of the input matrices.

Figure 3:
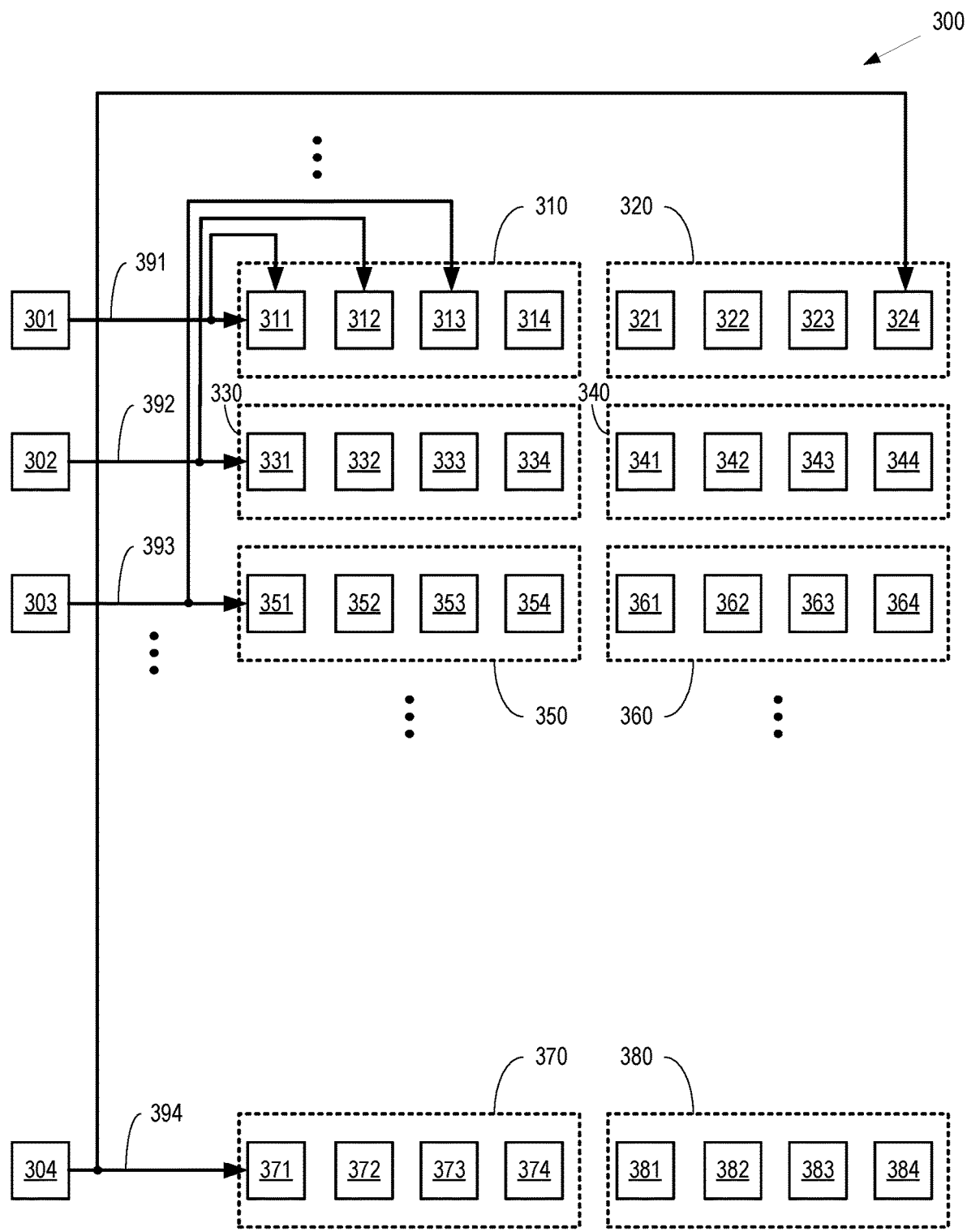
FIG. 3 is a block diagram of an array processor that implements broadcast synchronization for dynamically adaptable arrays that include memory interfaces that are mapped to different rows and columns of the array processor according to some embodiments.

FIG. 3 is a block diagram of an array processor 300 that implements broadcast synchronization for dynamically adaptable arrays that include memory interfaces that are mapped to different rows and columns of the array processor 300 according to some embodiments. The array processor 300 is used to implement some embodiments of the array processor 101 shown in FIG. 1. The array processor 300 includes DMA engines 301, 302, 303, 304 (collectively referred to herein as "the DMA engines 301-304") that fetch parameters from a memory such as the memory 105 shown in FIG. 1 or the memories 260, 265 shown in FIG. 2. The array processor 300 also includes SIMD units 310, 320, 330, 340, 350, 360, 370, 380 that are implemented using corresponding subsets of PEAs 311, 312, 313, 314, 321, 322, 323, 324, 331, 332, 333, 334, 341, 342, 343, 344, 351, 352, 353, 354, 361, 362, 363, 364, 371, 372, 373, 374, 381, 382, 383, and 384 (collectively referred to herein as "the PEAs 311-384" for the sake of brevity; the hyphen is therefore not intended to indicate a continuous sequence of numerals between 311 and 384). Some embodiments of the SIMD units 310, 320, 330, 340, 350, 360, 370, 380 are implemented in different WGPs. For example, a first WGP can implement the SIMD unit 310, 320, a second WGP can implement the SIMD units 330, 340, a third WGP can implement the SIMD units 350, 360, and a fourth WGP can implement the SIMD units 370, 380.

The DMA engines 301-304 are interconnected with mutually exclusive subsets of the PEAs 311-384. In the illustrated embodiment, the DMA engines 301-304 are interconnected to mutually exclusive rows and columns in the array of PEAs 311-384 using physical connections 391-394 that include wires, traces, and the like. The DMA engine 301 is connected to a row including the PEAs 311-314, 321-324 and a column including the PEAs 311, 331, 351, 371 by a physical connection 391. The DMA engine 301 can therefore broadcast parameter values fetched from the memory to the PEAs 311-314, 321-324, the PEAs 311, 331, 351, 371, subsets of these PEAs, or a combination thereof. The DMA engine 302 is connected to a row including the PEAs 331-334, 341-344 and a column including the PEAs 312, 332, 352, 372 by a physical connection 392. The DMA engine 302 can therefore broadcast parameter values fetched from the memory to the PEAs 331-334, 341-344, the PEAs 312, 332, 352, 372, subsets of these PEAs, or a combination thereof. The DMA engine 303 is connected to a row including the PEAs 351-354, 361-364 and a column including the PEAs 313, 333, 353, 373 by a physical connection 393. The DMA engine 303 can therefore broadcast parameter values fetched from the memory to the PEAs 351-354, 361-364, the PEAs 313, 333, 353, 373, subsets of these PEAs, or a combination thereof. The DMA engine 304 is connected to a row including the PEAs 371-374, 381-384 and a column including the PEAs 324, 344, 364, 384 by a physical connection 394. The DMA engine 304 can therefore broadcast parameter values fetched from the memory to the PEAs 371-374, 381-384, the PEAs 324, 344, 364, 384, subsets of these PEAs, or a combination thereof.

Figure 4:
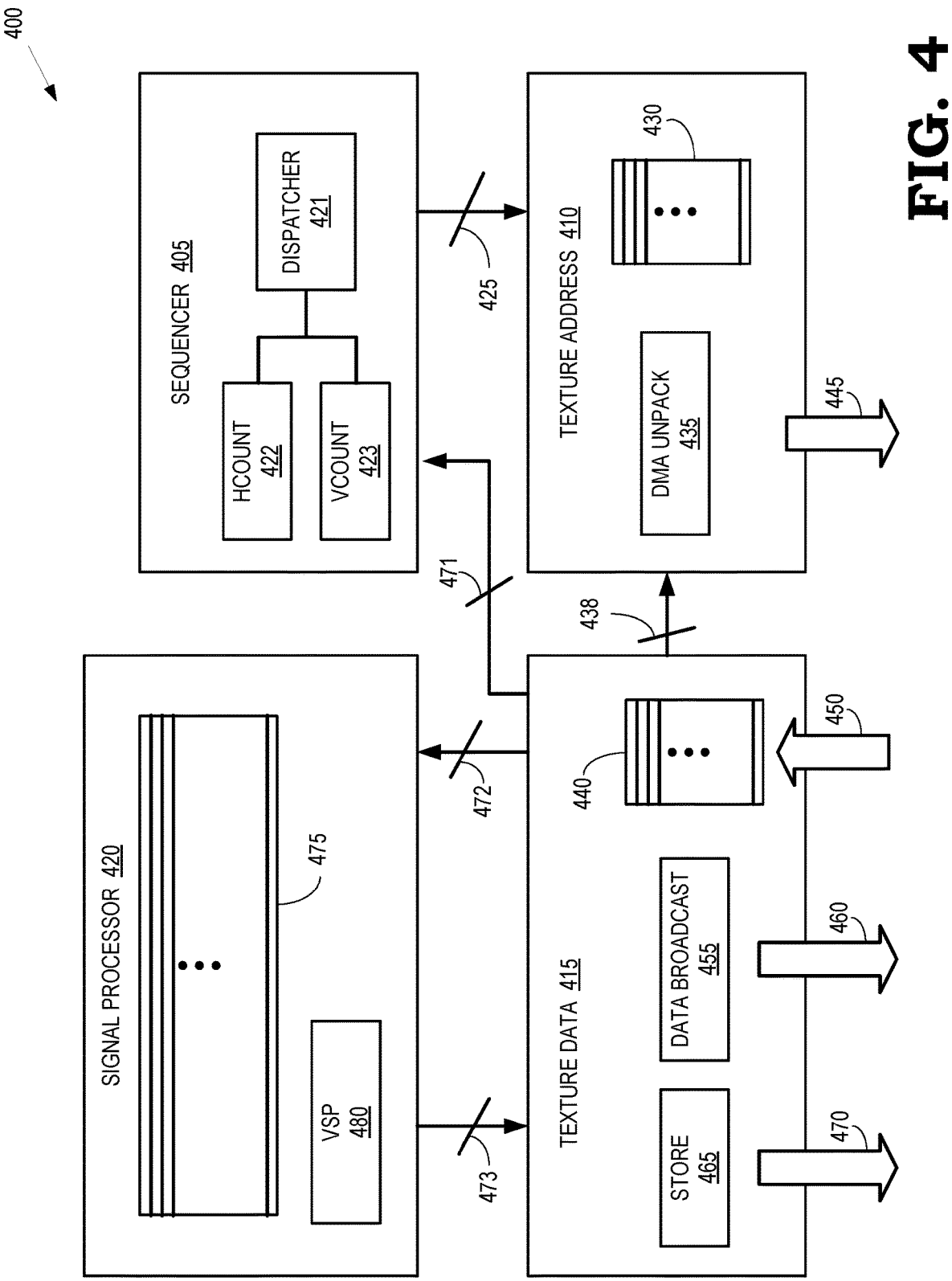
FIG. 4 is a block diagram of a processing system that exchanges synchronization signals over corresponding interfaces to synchronize broadcast signals in an array processor according to some embodiments.

FIG. 4 is a block diagram of a processing system 400 that exchanges synchronization signals over corresponding interfaces to synchronize broadcast signals in an array processor according to some embodiments. The processing system 400 is used to implement some embodiments of the processing system 100 shown in FIG. 1 and the processing system portion 200 shown in FIG. 2. In the illustrated embodiment, the processing system 400 includes a sequencer 405, a TA engine 410, a TD engine 415, and a signal processor 420 that corresponds to one of the PEAs in the processing system 100 shown in FIG. 1 or the processing system portion 200 shown in FIG. 2. The processing system 400 includes additional sequencers, TA engines, TD engines, and signal processors/PEAs that are not shown in FIG. 4 in the interest of clarity.

The sequencer 405 is designated as a master sequencer for one or more DMA instructions received by the sequencer 405. The sequencer 405 includes a dispatcher 421 that receives the DMA instructions and decodes the received DMA instructions. The dispatcher 421 generates a DMA command packet based on the information in the decoded DMA instruction and provides the DMA command packet to the TA engine 410 over the interface 425. The DMA command packet includes information indicating an address of a location in memory that includes the data that is to be fetched, a burst size (or memory request unit) used for fetching the data, and a number of bursts (or memory request units) to fetch. In response to, or concurrently with, launching the DMA command packet, the sequencer 405 increments a horizontal counter 422, a vertical counter 423, or a combination thereof based on the number of bursts/memory request units that are to be fetched based on the information in the DMA command packet.

The TA engine 410 includes buffers 430 that receive DMA command packets from the sequencer 405 via the interface 425. The DMA command packets are stored in entries of the buffers 430. The TA engine 410 also includes DMA unpack circuitry 435 that pops DMA command packets from the buffers 430 and unpacks the information in the DMA command packets. In some embodiments, the information in the DMA command packets is unpacked into M, N, K loops associated with the matrices that are to be multiplied in the signal processor 420. The TA engine 410 also receives back pressure (or other feedback) from the TD engine 415 via an interface 438. The back pressure on the interface 438 indicates whether there is space in a buffer 440 to receive the data requested in the DMA command packet. If the back pressure indicates that there is available space in the buffer 440, the TA engine 410 dispatches a request for the data, as indicated by the arrow 445. The data is returned and stored in the buffer 440, as indicated by the arrow 450.

The TD engine 415 includes data broadcast circuitry 455 that pushes/broadcasts blocks of data out to the associated PEAs or signal processors including the signal processor 420, as indicated by the arrow 460. The data broadcast circuitry 455 performs a broadcast based on the synchronization signals exchanged between the sequencer 405, the TD engine 415, and the signal processor 420, as discussed herein. The TD engine 415 also includes storage circuitry 465 that can export data for storage. Storing the data is performed based on the exchanged synchronization signals, as discussed herein. The TD engine 415 maintains interfaces 471, 472, 473 with the sequencer 405 and the signal processor 420. The interface 471 (TD_SQ_RDDONE_ACK) is used to convey signals that indicate that data has been successfully provided to the signal processor 420, which decrements the appropriate counters 422, 423 based on the signals received over the interface 470. The interface 472 (TD_SP_DATA_RETURN) is used to provide broadcast data from the TD engine 415 to the signal processor 420 (and other signal processors in the processing system 400) and convey signals that indicate that data has been returned in response to the DMA request from the TA engine 410. Thus, the TD engine 415 (and any other TD engines in the processing system 400) incorporates a one-to-many fan out of the TD_SP_DATA_RETURN interface 472, e.g., the one-to-many fan out TD_SP_DATA_RETURN[0], TD_SP_DATA_RETURN[1], TD_SP_DATA_RETURN[n−1], where n is the number of signal processors in the processing system 400. The interface 473 (SP_TD_EXEC_DONE) is used to convey signals that indicate that execution of the operation using the provided data has been completed at the signal processor 420.

The signal processor 420 includes a set 475 of registers such as VGPRs that receive data that is broadcast by the TD engine 415 and hold the data until it is ready to be consumed by a vector signal processor (VSPs) 480. Information indicating the status of the VGPRs in the set 475, e.g., whether there are available VGPRs to receive new data, is returned to the TD engine 415 via the interface 473. For example, the signal processor 420 can transmit information indicating the compute rate and amount of free VGPRs/registers for future loads allowing for load balancing for the broadcast loads.

Figure 5:
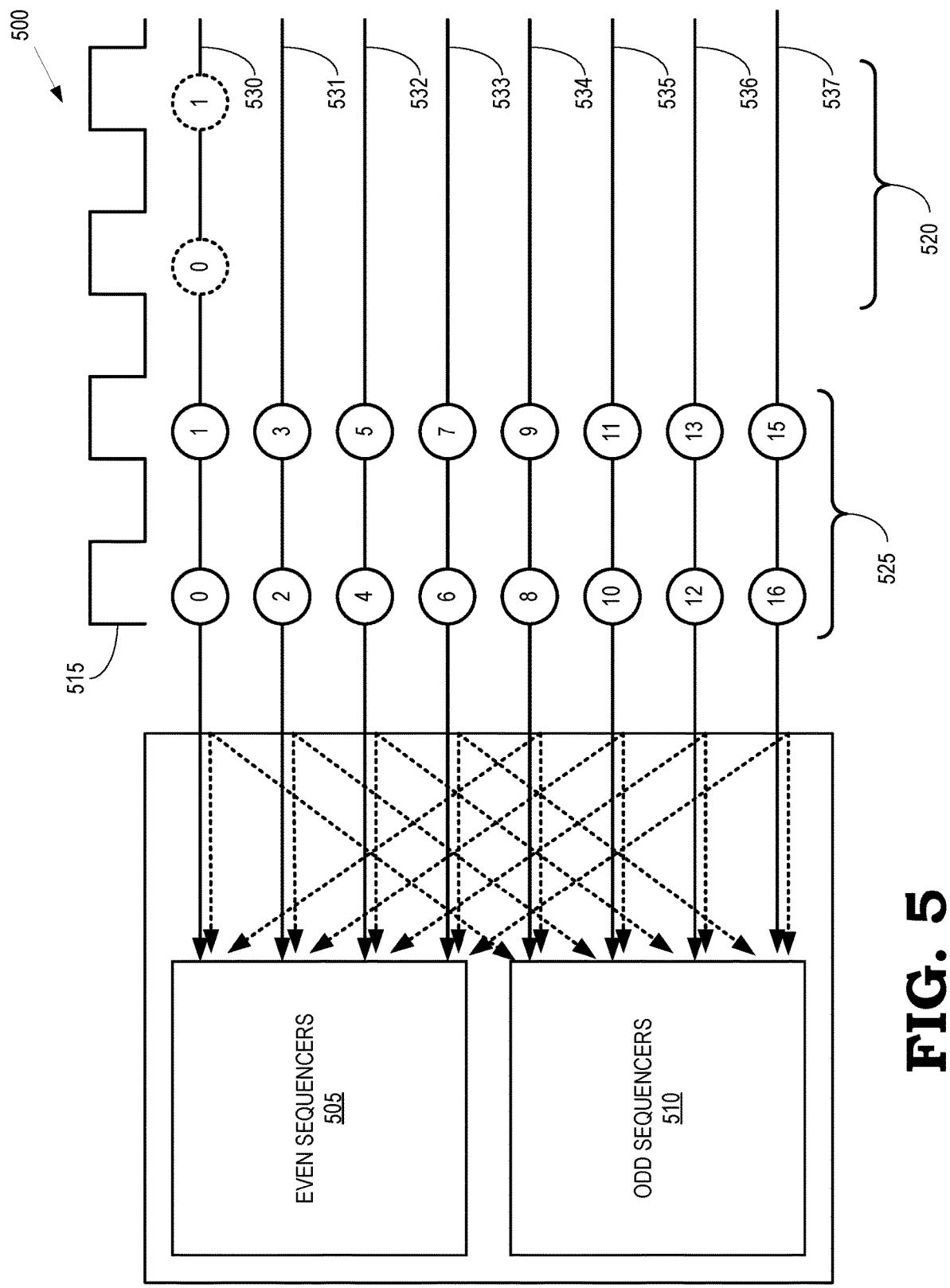
FIG. 5 is a block diagram of acknowledgments received at sequencers over interfaces between texture data (TD) engines and the sequencers according to some embodiments.

FIG. 5 is a block diagram of acknowledgments 500 received at sequencers over interfaces between TD engines and the sequencers according to some embodiments. The sequencers are represented as a set of even sequencers 505 and a set of odd sequencers 510. In the illustrated embodiment, pairs of sequences share an interface for receiving acknowledgments such as acknowledgments received over a TD_SQ_RDDONE interface. The sequencers 505, 510 are implemented in some embodiments of the processing system 100 shown in FIG. 1, the portion 200 of the processing system shown in FIG. 2, the array processor 300 shown in FIG. 3, and the processing system 400 shown in FIG. 4. A clock signal 515 is used to coordinate transmission of the acknowledgments over the TD_SQ_RDDONE interface.

In the illustrated embodiment, the acknowledgments 500 are transmitted over the TD_SQ_RDDONE interface to a pair of sequencers including one of the even sequencers 505 and one of the odd sequencers 510. For example, the acknowledgments 500 can be transmitted to sequencer 0 in the even sequencers 505 and sequencer 1 in the odd sequencers 510. Acknowledgments for the horizontal broadcasts are included in the group 520 (as indicated by the dashed circles) and acknowledgments or the vertical broadcasts are included in the group 525 (as indicated by the solid circles). The acknowledgments 500 are transmitted from corresponding TD engines. In the illustrated embodiment, the lines 530, 531, 532, 533, 534, 535, 536, 537 (collectively referred to herein as "the lines 530-537") indicate the acknowledgments transmitted by a corresponding set of TD engines TD0, TD1, TD2, TD3, TD4, TD5, TD6, and TD7.

The TD engine TD0 transmits acknowledgments of the horizontal broadcast acknowledgments [0] and [1] and the corresponding vertical broadcast acknowledgments [0] and [1]. The horizontal broadcast acknowledgments are read so that they are processed by both the even sequencers 505 and the odd sequencers 510. The vertical broadcast acknowledgments are read such that the acknowledgments [0-7] are processed by the even sequencers 505 and the acknowledgments [8-15] are processed by the odd sequencers 510. For example, for vertical broadcast acknowledgements, the acknowledgment 0 (and the solid circle) corresponds to a first VMEM issued by a master sequencer of CU0 (e.g., the CU 210 shown in FIG. 2) and acknowledgment 1 is received for the second VMEM issued by the same master sequencer. The vertical (or horizontal) requests include two VMEM request requirement to fetch the necessary data. In the illustrated embodiment, one VMEM request fetches two cache-lines (WAVE64 mode). The acknowledgments from the remaining compute units are indicated by the number pairs [2,3], [4,5], . . . , [14,15] for vertical broadcasts. The first eight acknowledgments are to even sequencers because they are received from TD0-3. The odd sequencers receive the remaining eight acknowledgments from TD4-7. Vertical broadcast acknowledgments are cleared as soon as they are processed. In the illustrated embodiment, the acknowledgments of horizontal broadcasts are only shown for CU0 (e.g., for CU 210 shown in FIG. 2). Horizontal acknowledgments from the next CU are received on the interface from TD1 and so on for the remaining compute units.

Figure 6:
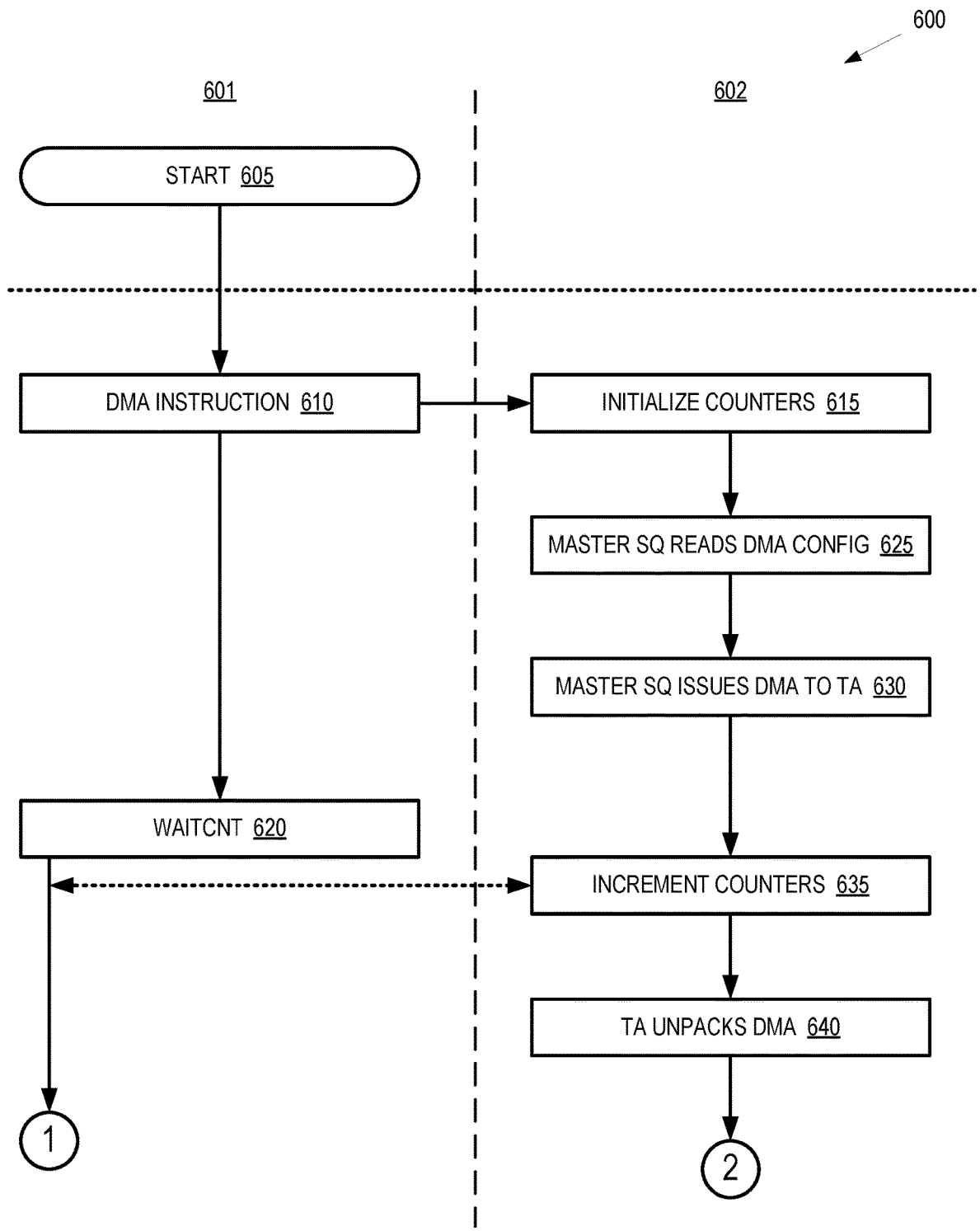
FIG. 6 is a flow diagram of a first portion of a method of performing broadcast synchronization in a dynamically adaptable array according to some embodiments.

FIG. 6 is a flow diagram of a first portion of a method 600 of performing broadcast synchronization in a dynamically adaptable array according to some embodiments. The method 600 is implemented in some embodiments of the processing system 100 shown in FIG. 1, the portion 200 of the processing system shown in FIG. 2, the array processor 300 shown in FIG. 3, and the processing system 400 shown in FIG. 4. The method 600 illustrates actions performed to maintain synchronization of a signal processor (SP3, on the left side 601) and actions performed to maintain synchronization of other hardware including the sequencers, TA engines, and TD engines (on the right side 602).

The method 600 starts at the block 605 and the SP3 encounters a DMA instruction at block 610. In response to encountering the DMA instruction, a sequencer initializes (at block 615) a set of counters including a horizontal counter and a vertical counter based on the characteristics of the DMA instruction, as discussed herein. At block 620, the SP3 executes a waiting instruction (waitcnt) that represents a wait condition with respect to a particular counter value requirement. For example, if a sequencer counter does not have a predetermined value, the waiting instruction (waitcnt) does not allow the SP3 to process the next instruction because the instruction may have a dependency on a hardware inflight request. Values of the sequencer counters are decremented in response to acknowledgments received from the hardware, e.g., the TD engines, and the wait condition represented by the waiting instruction (waitcnt) is satisfied in response to the values of the counters reaching a predetermined value (such as 0) that indicates that all the expected acknowledgments have been received for the DMA instruction.

At block 625, a master sequencer reads the DMA configuration information from a set of registers. At block 630, the master sequencer issues the DMA instruction to the TA engine on a command interface. At block 635, the master sequencer increments values of the vertical counter and horizontal counter based on the M, N, K loop configuration indicated in the set of registers. The incremented values of the vertical and horizontal counters are processed by the waitcnt instruction at the SP3. At block 640, the TA engine unpacks the DMA instruction and issues a number of commands per cycle based on the M, N, K loop configuration indicated in the set of registers. The method 600 then transitions to an asynchronous operation mode via the nodes 1 and 2.

Figure 7:
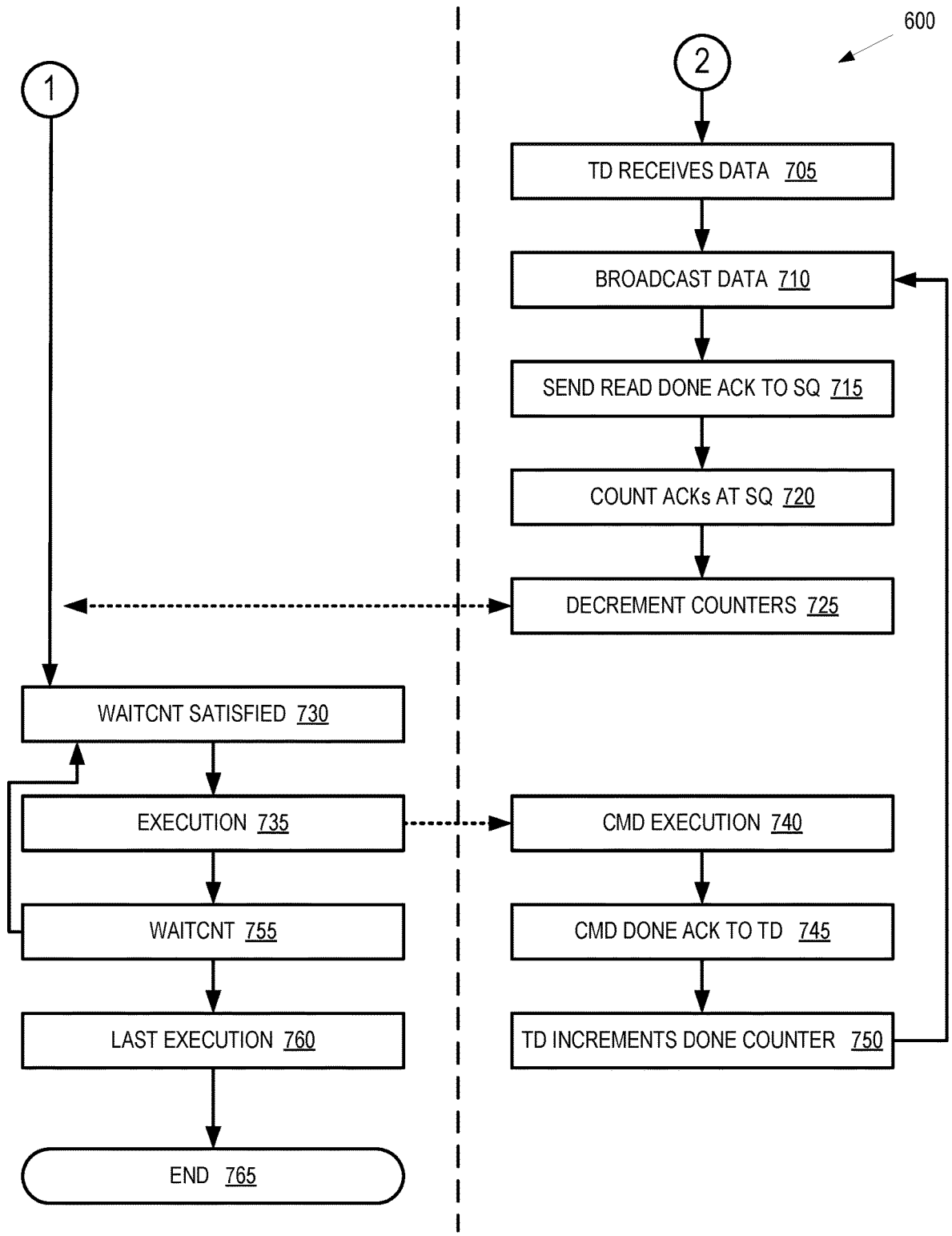
FIG. 7 is a flow diagram of a second portion of the method of performing broadcast synchronization in a dynamically adaptable array according to some embodiments.

FIG. 7 is a flow diagram of a second portion of the method 600 of performing broadcast synchronization in a dynamically adaptable array according to some embodiments. The second portion of the method 600 is connected to the first portion of the method 600 shown in FIG. 6 via the nodes 1 and 2.

At block 705, the TD engines receive data in response to the request that is broadcast by the TA engines based on the DMA instruction. If a load broadcasting condition is met, the data is processed and broadcast via an interface to signal processors or PEAs, at block 710.

At block 715, the TD engines transmit "done" acknowledgments on the interface to the master sequencer to indicate that the data has been successfully broadcast. At block 720, the master sequencer counts the received "done" acknowledgments. At block 725, the master sequencer decrements the horizontal and vertical counters based on the number of received "done" acknowledgments. The decremented values of the horizontal and vertical counters are processed by the waitcnt command at the SP3.

At block 730, the SP3 determines that the waitcnt condition is satisfied. At block 730, the SP3 initiates execution of an MFMA command using the returned data. At block 735, a waitcnt instruction is executed to determine whether all the instances of the MFMA command are completed. As long as some of the instances of the MFMA command are incomplete, execution continues at block 735.

In response to the SP3 initiating execution of the MFMA command at block 735, the MFMA command is executed on a signal processor in the hardware at the block 740. At block 745, an acknowledgment is transmitted from the signal processor to the TD engine on the SP_TD_EXEC_DONE interface in response to completing execution of the MFMA command. The TD engine increments a corresponding counter (SP_TD_EXEC_DONE_CNT) at block 750 and the method 600 flows back to the block 710.

At block 755, the SP3 determines whether the waitcnt instruction has been satisfied and the processes are complete. If not, the method 600 flows back to the block 730. In the illustrated embodiment, the block 755, the block 730, and the block 735 form a loop or sequence of multiple GEMM executions that execute in parallel to the DMA load. The dependent executions are therefore guarded with the waitcnt for their dependent load. In response to determining (at the block 755) that the processes are complete, the method 600 flows to the block 760 and the SP3 completes the last execution. The method 600 ends at the block 765.

Figure 8:
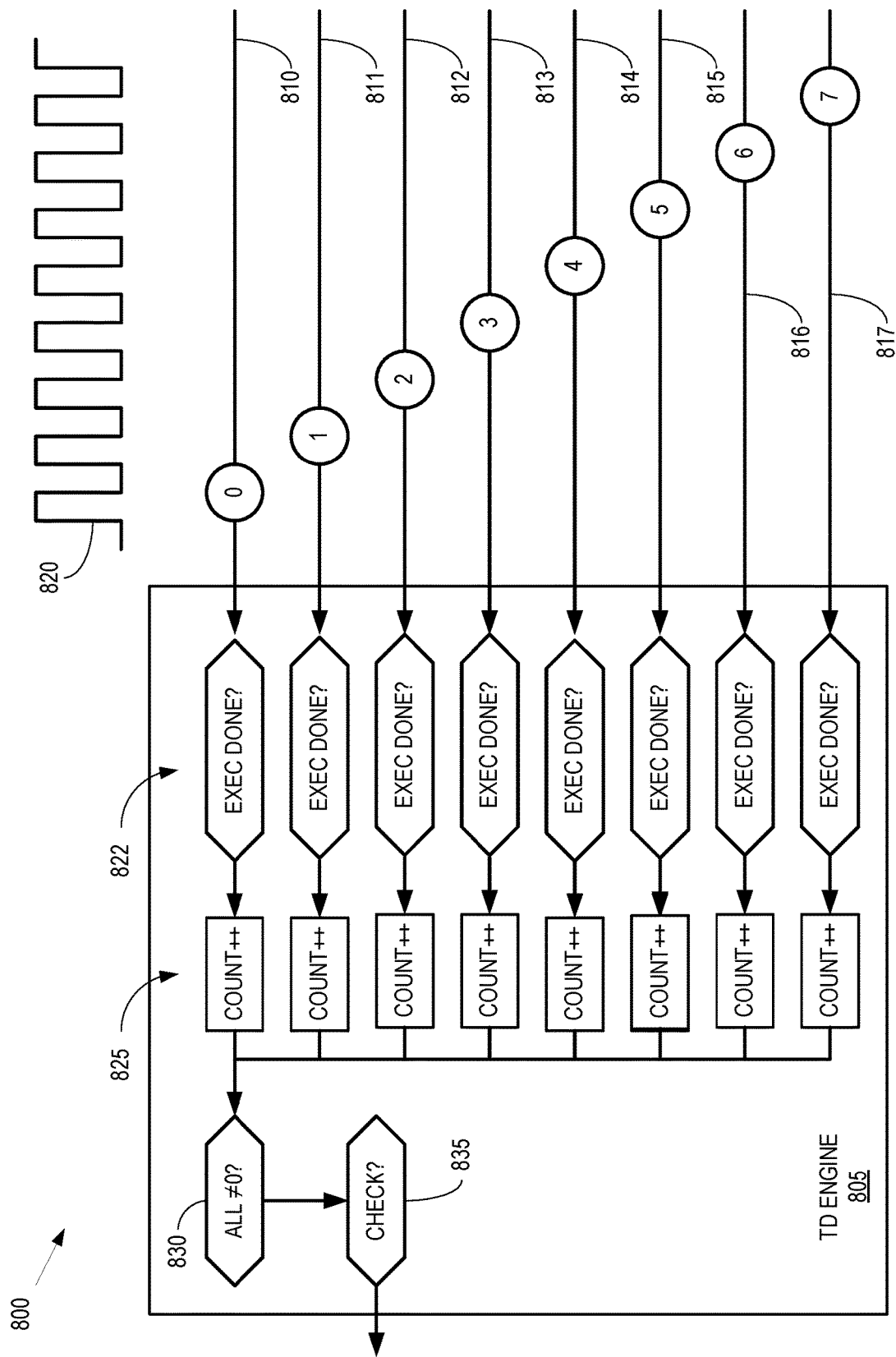
FIG. 8 is a flow diagram of a broadcast system in TD unit that uses synchronization signals from a signal processor to perform load balancing according to some embodiments.

FIG. 8 is a flow diagram of a broadcast system 800 in a TD unit that uses synchronization signals from a signal processor to perform load balancing according to some embodiments. The processing system 800 is used to implement some embodiments of the processing system 100 shown in FIG. 1, the processing system portion 200 shown in FIG. 2, the array processor 300 shown in FIG. 3, and the processing system 400 shown in FIG. 4.

The processing system 800 includes a TD engine 805 that receives acknowledgments from signal processors or PEAs via corresponding SP_TD_EXEC_DONE interfaces 810, 811, 812, 813, 814, 815, 816, 817, which are collectively referred to herein as "the SP_TD_EXEC_DONE interfaces 810-817." Reception of the acknowledgments over the SP_TD_EXEC_DONE interfaces 810-817 is coordinated by a clock signal 820. Monitoring circuitry 822 monitors the SP_TD_EXEC_DONE interfaces 810-817 for acknowledgments and generates signals in response to detecting acknowledgments on the corresponding SP_TD_EXEC_DONE interfaces 810-817. Counters 825 in the TD engine 805 are incremented in response to receiving the signals from the monitoring circuitry 822 indicating that execution of the corresponding instruction is done. The TD engine 805 then determines (at decision block 830) whether the counters 825 indicate that all the acknowledgments have been received. Once all the acknowledgments have been received, the TD engine 805 checks (at block 835) whether the LOADED_COUNT—EXEC_COUNT≤VGPR_SETS and, if so, transmits a signal that initiates broadcast loading, as discussed herein.

Figure 9:
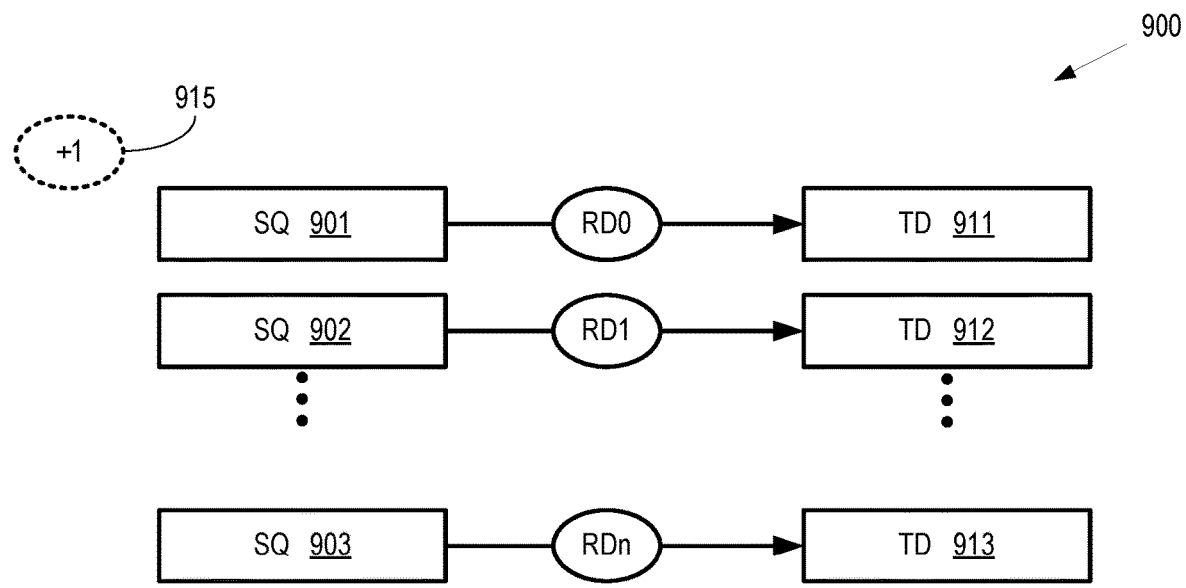
FIG. 9 is a block diagram of a process of asynchronously issuing read requests according to some embodiments.

FIG. 9 is a block diagram of a process 900 of asynchronously issuing read requests according to some embodiments. The process 900 is implemented in some embodiments of the processing system 100 shown in FIG. 1, the processing system portion 200 shown in FIG. 2, the processing system 300 shown in FIG. 3, and the processing system 400 shown in FIG. 4.

In the illustrated embodiments, master sequencers 901, 902, 903 (collectively referred to herein as "the master sequencers 901-903") issue read requests (RD0, RD1, . . . , RDn) to corresponding TD engines 911, 912, 913 (collectively referred to herein as "the TD engines 911-913"). In response to issuing the read request RD0 from the master sequencer 901, the master sequencer 901 increments the vertical counter 915. Although not shown in FIG. 9, the other master sequencers 902, 903 also issue read requests to the TD engines 911-913.

Figure 10:
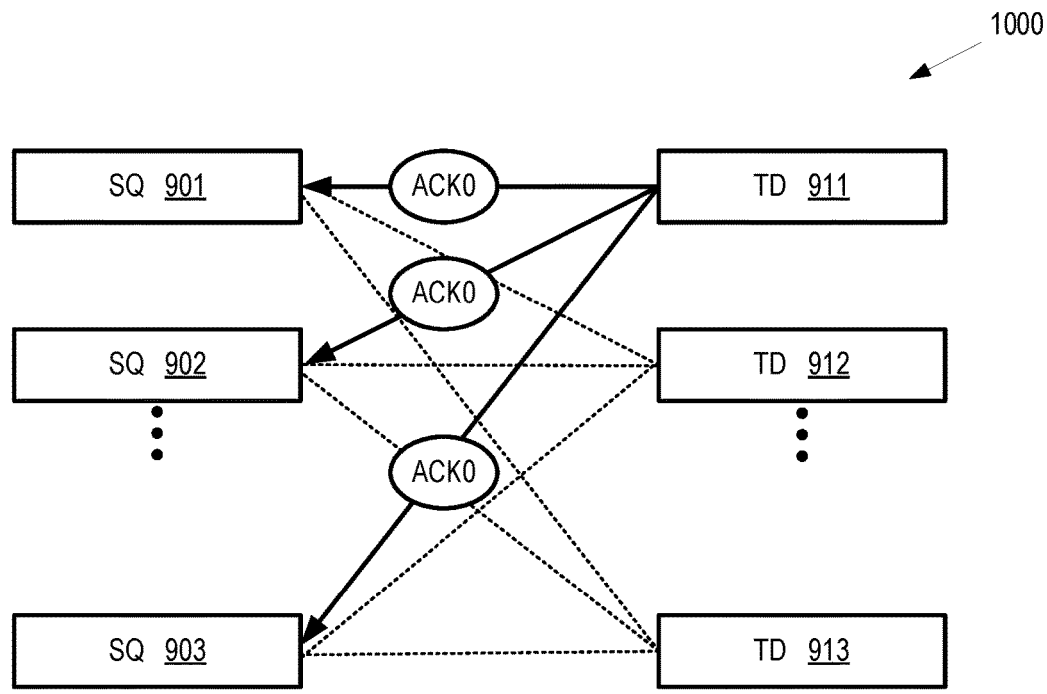
FIG. 10 is a block diagram of a process of asynchronously returning read acknowledgments from a TD engine to multiple master sequencers according to some embodiments.

FIG. 10 is a block diagram of a process 1000 of asynchronously returning read acknowledgments from a TD engine to multiple master sequencers according to some embodiments. The process 1000 is implemented in some embodiments of the processing system 100 shown in FIG. 1, the processing system portion 200 shown in FIG. 2, the processing system 300 shown in FIG. 3, and the processing system 400 shown in FIG. 4. In the illustrated embodiment, the process 1000 is performed in response to the master sequencers 901-903 issuing the read requests (RD0, RD1, . . . , RDn) to corresponding TD engines 911-913, as shown in FIG. 9.

In the illustrated embodiment, the TD engine 911 transmits read acknowledgments (ACK0) to each of the master sequencers 901-903 that has transmitted a read request to the TD engine 911. The other TD engines 912, 913 also transmit read acknowledgments to the master sequencers 901-903, as indicated by the dotted lines.

Figure 11:
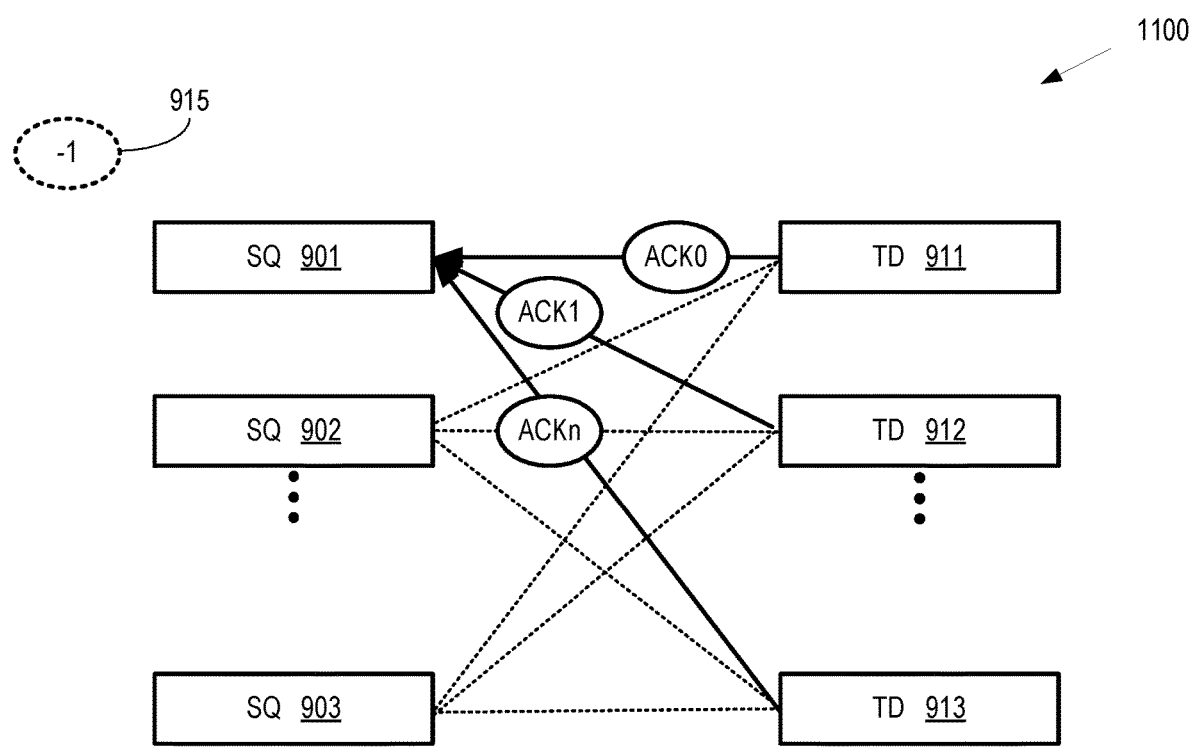
FIG. 11 is a block diagram of a process of asynchronously returning read acknowledgments from multiple TD engines to a single master sequencer according to some embodiments.

FIG. 11 is a block diagram of a process 1100 of asynchronously returning read acknowledgments from multiple TD engines to a single master sequencer according to some embodiments. The process 1000 is implemented in some embodiments of the processing system 100 shown in FIG. 1, the processing system portion 200 shown in FIG. 2, the processing system 300 shown in FIG. 3, and the processing system 400 shown in FIG. 4. In the illustrated embodiment, the process 1000 is performed in response to the master sequencers 901-903 issuing the read requests (RD0, RD1, . . . , RDn) to corresponding TD engines 911-913, as shown in FIG. 9.

In the illustrated embodiment, the TD engines 911-913 asynchronously return read acknowledgments (ACK0, ACK1, . . . , ACKn) to the master sequencer 901 in response to the read request RD0 transmitted by the master sequencer 901, as shown in FIG. 9. Once all the read acknowledgments (ACK0, ACK1, . . . , ACKn) have been returned to the master sequencer 901, the master sequencer 901 decrements the vertical counter 915. Thus, the master sequencer 901 decrements the vertical counter 915 in response to receiving the last of the read acknowledgments (ACK0, ACK1, . . . , ACKn) from the TD engines 911-913 regardless of the order in which the read acknowledgments (ACK0, ACK1, . . . , ACKn) are received.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   processor element arrays (PEAs) distributed in rows and columns, wherein the PEAs are configured to perform operations on parameter values;
   a first sequencer configured to receive a first direct memory access (DMA) instruction comprising a request to read data from at least one address in memory;
   a texture address (TA) engine configured to request the data from the memory based on the at least one address; and
   a texture data (TD) engine configured to provide the data to the PEAs, wherein the PEAs provide first synchronization signals to the TD engine to indicate availability of registers for receiving the data, and wherein the TD engine provides second synchronization signals to the first sequencer in response to receiving acknowledgments that the PEAs have consumed the data.

2. The apparatus of claim 1, further comprising:
   a plurality of second sequencers, wherein the first sequencer is associated with a PEA at an intersection of a row and a column that receive data broadcast by the first sequencer, and wherein the plurality of second sequencers broadcast the data to mutually exclusive subsets of the rows and columns.

3. The apparatus of claim 1, wherein the first synchronization signals indicate a compute rate and a number of available vector general-purpose registers (VGPRs), and wherein the TD engine uses the first synchronization signals for load balancing broadcasts of the data from the TD engine to the PEAs.

4. The apparatus of claim 3, wherein the TD engine determines whether VGPRs are available to receive the broadcast data, and wherein the TD engine broadcasts the data to the PEAs in response to determining that sufficient free VGPRs are available.

5. The apparatus of claim 1, wherein the first sequencer is configured to decode the first DMA request and to request the data from the memory by providing a first DMA command packet.

6. The apparatus of claim 5, wherein the first DMA command packet comprises information indicating a burst size of a memory request unit and a number of memory request units to fetch.

7. The apparatus of claim 6, wherein the first sequencer increments horizontal and vertical request counters by the number of memory request units concurrently with providing the first DMA command packet.

8. The apparatus of claim 7, wherein the first sequencer decrements the horizontal and vertical request counters based on information received in the second synchronization signals.

9. The apparatus of claim 8, wherein the first sequencer provides a second DMA command packet for a second DMA instruction in response to the horizontal and vertical request counters having values indicating that outstanding requests are cleared.

10. A method comprising:
    receiving, at a first sequencer, a first direct memory access (DMA) instruction comprising a request to read data from at least one address in memory;
    generating, at a texture address (TA) engine, a request to retrieve the data from the memory based on the at least one address;
    providing, from a texture data (TD) engine, the data to processor element arrays (PEAs) distributed in rows and columns;
    providing, from the PEAs, first synchronization signals to the TD engine to indicate availability of registers for receiving the data; and
    providing, from the TD engine, second synchronization signals to the first sequencer in response to receiving acknowledgments that the PEAs have consumed the data.

11. The method of claim 10, wherein the first synchronization signals indicate a compute rate and a number of available vector general-purpose registers (VGPRs), further comprising:
    performing load balancing of load broadcasts of the data from the TD engine to the PEAs based on the first synchronization signals.

12. The method of claim 11, further comprising:
    determining, at the TD engine, whether VGPRs are available to receive the broadcast data; and
    broadcasting, from the TD engine, the data to the PEAs in response to determining that sufficient free VGPRs are available.

13. The method of claim 10, further comprising:
    decoding, at the first sequencer, the first DMA request; and
    requesting, from the first sequencer, the data from the memory by providing a first DMA command packet to the TA engine.

14. The method of claim 13, wherein the first DMA command packet comprises information indicating a burst size of a memory request unit and a number of memory request units to fetch.

15. The method of claim 14, further comprising:
incrementing, at the first sequencer, horizontal and vertical request counters by the number of memory request units concurrently with providing the first DMA command packet.

16. The method of claim 15, further comprising:
decrementing, at the first sequencer, the horizontal and vertical request counters based on information received in the second synchronization signals.

17. The method of claim 16, further comprising:
providing, from the first sequencer, a second DMA command packet for a second DMA instruction in response to the horizontal and vertical request counters having values indicating that outstanding requests are cleared.

18. A method comprising:
exchanging first synchronization signals between a processor element array (PEA) and a texture data (TD) engine to indicate availability of registers in the PEA for receiving data broadcast by the TD engine in response to a first request to read first data from at least one first address in memory;
exchanging second synchronization signals between the TD engine and a first sequencer in response to receiving acknowledgments that the PEA has consumed the first data broadcast by the TD engine; and
providing, from the first sequencer to a texture address (TA) engine, a second request to read second data from at least one second address in the memory based on the first and second synchronization signals.

19. The method of claim 18, wherein providing the second request comprises:
decoding, at the first sequencer, a DMA request; and
providing, from the first sequencer, a second request the second data from the memory, wherein the second request comprises information indicating a burst size of a memory request unit and a number of memory request units to fetch as indicated in the DMA request.

20. The method of claim 19, further comprising:
incrementing, at the first sequencer, horizontal and vertical request counters by the number of memory request units concurrently with providing the second request; and
decrementing, at the first sequencer, the horizontal and vertical request counters based on information received in the second synchronization signals.

* * * * *